(12) United States Patent
Handa et al.

(10) Patent No.: US 8,210,145 B2
(45) Date of Patent: Jul. 3, 2012

(54) ENGINE START DEVICE

(75) Inventors: Hiroyuki Handa, Osaka (JP); Koji Yoshida, Nara (JP)

(73) Assignee: Panasonic Corporation, Osaka (JP)

( * ) Notice: Subject to any disclaimer, the term of this patent is extended or adjusted under 35 U.S.C. 154(b) by 872 days.

(21) Appl. No.: 11/914,014

(22) PCT Filed: May 17, 2006

(86) PCT No.: PCT/JP2006/309806
§ 371 (c)(1),
(2), (4) Date: Nov. 9, 2007

(87) PCT Pub. No.: WO2006/123682
PCT Pub. Date: Nov. 23, 2006

(65) Prior Publication Data
US 2009/0050092 A1   Feb. 26, 2009

(30) Foreign Application Priority Data

May 17, 2005 (JP) .................. 2005-143773
May 17, 2005 (JP) .................. 2005-143774

(51) Int. Cl.
*G01N 27/02* (2006.01)
*G01N 27/04* (2006.01)
*F02N 11/08* (2006.01)

(52) U.S. Cl. .............. 123/179.3; 123/179.28; 290/38 R; 320/166; 320/167; 324/430; 324/433

(58) Field of Classification Search ............... 123/179.3, 123/179.28; 290/38 R; 320/104, 166, 167; 324/430, 433
See application file for complete search history.

(56) References Cited

U.S. PATENT DOCUMENTS

| 3,853,107 | A  | * | 12/1974 | Sieja .............................. 123/598 |
| 5,714,863 | A  | * | 2/1998  | Hwang et al. .................. 320/166 |
| 6,202,615 | B1 | * | 3/2001  | Pels et al. .................... 123/179.3 |
| 6,329,797 | B1 | * | 12/2001 | Bluemel et al. .................. 322/28 |
| 6,516,153 | B2 | * | 2/2003  | Honda et al. .................. 396/206 |
| 6,605,921 | B2 | * | 8/2003  | Osada et al. .................. 320/104 |

(Continued)

FOREIGN PATENT DOCUMENTS

GB    2068184 A   *   8/1981

(Continued)

OTHER PUBLICATIONS

International Search Report for International Application No. PCT/JP2006/309806 dated Aug. 15, 2006.

*Primary Examiner* — Stephen K Cronin
*Assistant Examiner* — Raza Najmuddin
(74) *Attorney, Agent, or Firm* — Ratner Prestia (57) ABSTRACT

An engine start device includes a generator, a battery charged by the generator, a starter, an electric double layer capacitor and a DC/DC converter. The electric double layer capacitor is connected between the starter and the battery. The DC/DC converter has an input terminal connected to the battery and the electric double layer capacitor. The DC/DC converter has an output terminal connected to the starter and the electric double layer capacitor. According to voltage of the battery, internal DC resistance of the battery or internal DC resistance of the electric double layer capacitor, the DC/DC converter effects control of charge voltage of the electric double layer capacitor so as to stabilize voltage applied to a starter motor and stabilize the engine start.

18 Claims, 9 Drawing Sheets

U.S. PATENT DOCUMENTS

| | | | |
|---|---|---|---|
| 7,023,107 B2 * | 4/2006 | Okuda et al. | 307/10.1 |
| 7,221,064 B2 * | 5/2007 | Okuda et al. | 307/10.1 |
| 7,588,021 B2 * | 9/2009 | Lykowski | 123/606 |
| 2004/0222771 A1 * | 11/2004 | Iwata et al. | 320/134 |
| 2006/0071639 A1 * | 4/2006 | Ross et al. | 320/116 |
| 2010/0308650 A1 * | 12/2010 | Perseval et al. | 307/10.1 |

FOREIGN PATENT DOCUMENTS

| | | | |
|---|---|---|---|
| JP | 02-259276 | | 10/1990 |
| JP | 05106539 A | * | 4/1993 |
| JP | 11-107892 A | | 4/1999 |
| JP | 11-122709 | | 4/1999 |
| JP | 3400319 | | 2/2003 |
| JP | 2003-070103 A | | 3/2003 |
| JP | 2003-148310 | * | 5/2003 |
| JP | 2004-116296 A | | 4/2004 |
| JP | 2005204421 A | * | 7/2005 |
| JP | 2005-530081 A | | 10/2005 |
| KR | 2003006269 A | * | 1/2003 |
| SU | 1456632 A | * | 2/1989 |
| WO | WO 03/099605 A1 | | 12/2003 |

* cited by examiner

ENGINE START DEVICE

THIS APPLICATION IS A U.S. NATIONAL PHASE APPLICATION OF PCT INTERNATIONAL APPLICATION PCT/JP2006/309806.

TECHNICAL FIELD

The present invention relates to an engine start device that supplies power to a starter connected to a driving system of an engine; specifically, relates to a stop-idling operation in a vehicle employing a single battery, i.e., an ordinary vehicle driven on 14V system.

BACKGROUND ART

In recent years, from the viewpoint of environmental protection, the motor vehicle industry has promoted technological innovation, as is seen in a hybrid car that has been in practical use. Besides, an advanced vehicle having a stop-idling function—the engine temporarily makes a stop under a certain condition and automatically restarts—has been already on the market.

Vehicles with a stop-idling function operate on various driving systems: a 14V system and a 42V system. The 14V system employs a single battery with a voltage rating of 12V, whereas the 42V system employs a combined use of a battery with a voltage rating of 36V and a battery with a voltage rating of 12V. Compared to the conventionally used 14V system, the 42V system needs a higher cost. In terms of low-cost production and operation, manufacturers are pursuing the development of the stop-idling function on a vehicle with a single battery.

An electric double layer capacitor is a component essential to the technology above. The electric double layer capacitor is generally used with a conventionally used lead acid battery. Japanese Patent No. 3400319 discloses a method for charging an electric double layer capacitor with the use of braking energy.

Japanese Patent Unexamined Publication No. H02-259276 discloses an improved method for starting the engine. According to the method, a starter is driven by a structure having an electric double layer capacitor connected in series to a lead acid battery. The structure decreases a load on the lead acid battery, increasing the operating life.

According to the conventional engine start device, however, a relay switches between the in-series circuit and the parallel circuit of the battery and the electric double layer capacitor that carry large current needed to drive the starter. The relay switching operation applies a voltage to the starter about two times higher than that applied to the battery, that is, the starter undergoes an amount of change in voltage two times greater than that of the battery.

The battery and the electric double layer capacitor have internal resistance that varies wildly depending on ambient temperature and operating environment, and accordingly, the voltage applied to the starter varies depending on conditions. This degrades a reliable operation in engine start.

Besides, when the electric double layer capacitor is connected in parallel to the battery, the circuit undergoes short-circuit current. This has an ill effect on reliability of the electric double layer capacitor and the relay operations.

When a vehicle that operates on the 14V system (i.e., that employs a battery with a voltage rating of 12V) stops at an intersection and the stop-idling function is activated during the stop, a generator feeds no power since the engine stops. That is, during the stop-idling time, the electric power consumed by vehicle-mounted devices, such as an audio system and a navigation system, is fed from the battery. The battery voltage therefore decreases depending on the length of the stop-idling time and the amount of power consumed by the vehicle-mounted devices.

In a conventional vehicle with no stop-idling function, the generator keeps the battery in a fully charged condition. On the other hand, in a vehicle with stop-idling function, the battery is not always kept in the fully charged condition and the engine sometimes restarts under an unstable condition of the battery voltage.

SUMMARY OF THE INVENTION

The present invention addresses the problems above. As an object of the present invention, the engine start device provides the starter with stabilized voltage even under a condition having change in battery voltage, starting the engine in a stable condition. At the same time, the device provides the starter with a voltage higher than the conventional battery voltage and improves torque of the motor of the starter, offering a smooth, efficient engine start. In addition, the device can cope with decrease in battery voltage, which contributes to a prolonged stop-idling time. In a conventional device, reliability of the relay operation has been an important key since the circuit carries large current. To enhance the reliability, the device of the present invention employs a system with no relay. The engine start device of the present invention thus offers a reliable engine start operation.

The engine start device of the present invention has a generator connected to the driving system of an engine; a battery charged by the generator; a starter; an electric double layer capacitor connected between the starter and the battery; and a DC/DC converter. The DC/DC converter has an input terminal, which is connected to the battery and the electric double layer capacitor, and an output terminal, which is connected to the starter and the electric double layer capacitor. With the structure above, the DC/DC converter effects control of charge-voltage setting of the electric double layer capacitor.

According to the engine start device of the present invention, a total amount of the voltage of the battery and the charge voltage of the electric double layer capacitor is applied to the starter. With the application of voltage higher than that obtained by the battery voltage only, the starter starts in higher torque, enhancing the starting performance of the engine. The device determines the charge voltage of the electric double layer capacitor according to the voltage drop caused by the large current flown into the starter, providing the engine start with stability.

REFERENCE MARKS IN THE DRAWINGS

1 starter
2 starter motor
3 starter relay
4 battery
5 electric double layer capacitor
6, 61 DC/DC converter
7 generator
8 current-detecting means
9 voltage-detecting means
10 diode
11 controller

DETAILED DESCRIPTION OF THE PREFERRED EMBODIMENTS

First Exemplary Embodiment

Hereinafter, the structure of the first exemplary embodiment will be described with reference to FIG. 1 through FIG. 5.

Figure 1:
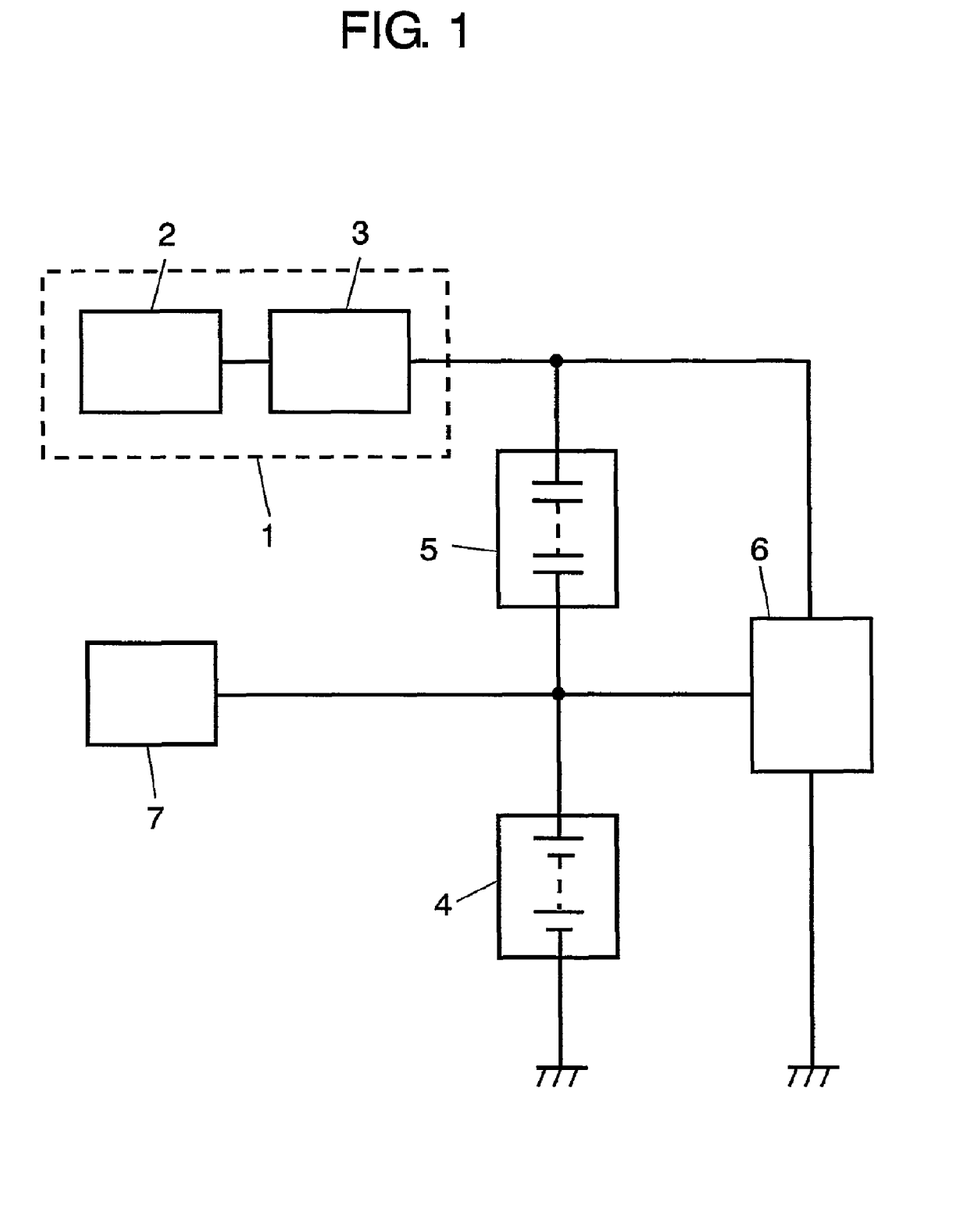
FIG. 1 is a circuit diagram showing the structure of an engine start device in accordance with a first exemplary embodiment of the present invention.

FIG. 1 is a circuit diagram showing the structure of an engine start device in accordance with the first exemplary embodiment of the present invention. Starter 1 in FIG. 1, which is connected to the driving system of the engine, is formed of starter motor 2 and starter relay 3. Generator 7 is connected to the driving system of the engine. Battery 4 is a lead acid battery with a voltage rating of 12V. Electric double layer capacitor 5 is connected between starter 1 and battery 4. An input terminal of DC/DC converter 6 is connected to the junction point of generator 7 and battery 4 and an output terminal of converter 6 is connected to the junction point of starter 1 and electric double layer capacitor 5.

How to start the engine in the engine start device structured above is described hereinafter.

Prior to the initial start of the engine, receiving power from battery 4, DC/DC converter 6 starts working and charges electric double layer capacitor 5 up to a predetermined voltage, and then starter relay 3 turns ON. Through the process above, starter motor 2 has the application of voltage as a total amount of the voltage of battery 4 and the voltage of electric double layer capacitor 5, and the engine starts working.

When restarting after stop idling, the engine undergoes the same process; starter relay 3 turns ON and starter motor 2 has the application of voltage as a total amount of the voltage of battery 4 and the voltage of electric double layer capacitor 5. That is, compared to the conventional engine start with application of voltage from battery 4 only, the structure of the embodiment provides starter motor 2 with a higher voltage. This allows the engine to have a quick and reliable start, enhancing a smooth start of a vehicle.

As starter motor 2 starts working, electric double layer capacitor 5 decreases the voltage by discharging. However, DC/DC converter 6 recharges capacitor 5. Recharging operation in driving at a constant speed and in braking contributes to an effective use of regenerative power.

Starting-up operation of starter motor 2 needs current as high as a few hundred amperes in a short time (approx. one second), whereas recharging operation does not need to do in a rush—it can take time 10 times longer than the time for the starting-up. That is, DC/DC converter 6 with an output of tens of amperes satisfactorily functions, by which the engine start device can be formed compact.

Figure 2:
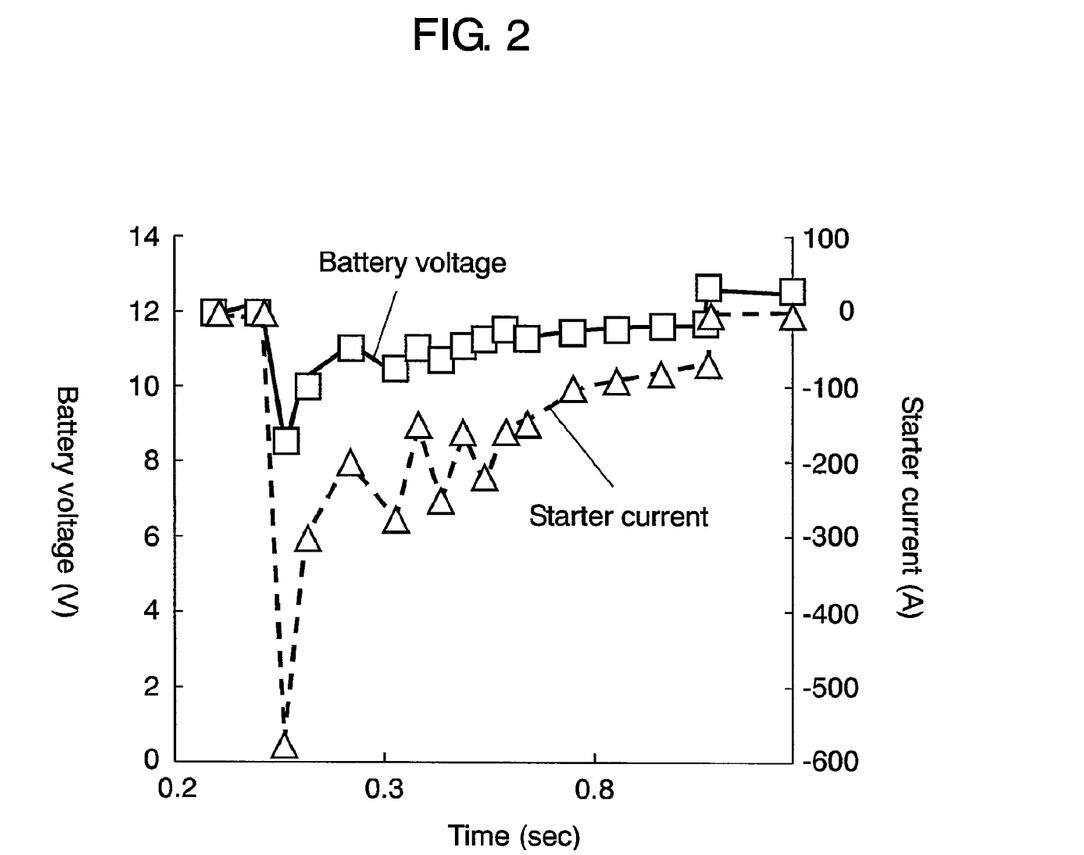
FIG. 2 shows changes in battery voltage and current flown into an ordinary starter when the engine start device operates the starter motor in accordance with the first exemplary embodiment.

FIG. 2 shows changes in battery voltage and current flown into an ordinary starter when the engine start device operates the starter motor.

As is apparent from FIG. 2, a surge of current as high as a few hundred amperes abruptly flows into the starter and accordingly, the battery voltage decreases. The decrease in battery voltage is caused by internal DC resistance of the battery.

As is mentioned earlier, it is known that the internal DC resistance of the battery varies depending on ambient temperature and operating environment. Increase in internal DC resistance invites decrease in battery voltage, which takes a long time for the starter to achieve a proper RPM of the starter motor. It can cause a serious problem in engine start.

During the stop-idling time, the engine is at rest and therefore generator 7 does not operate. That is, electric power consumed by vehicle-mounted devices during the time is fed through discharge from battery 4. The power consumption during stop idling decreases the voltage of battery 4. The engine has to restart under further decreased battery voltage. The aforementioned vehicle-mounted devices, such as an air-conditioning system, an audio system and a navigation system, should operate independently of the condition of the engine.

Changes in engine-starting time in the restarting operation after stop idling annoy the driver; needless to say, the engine should quickly start under a stable condition.

According to the engine start device of the embodiment, starter 1 starts working with the application of voltage as a total amount of the voltage of battery 4 and the voltage of electric double layer capacitor 5. Besides, DC/DC converter 6 properly controls the voltage of electric double layer capacitor 5. With the structure above, properly controlled voltage is applied to starter 1.

As described above, even in a case where power consumption by the vehicle-mounted devices during the stop-idling time decrease the voltage of battery 4, charge voltage of electric double layer capacitor 5 compensates for the voltage decrease, enhancing a stable application of voltage to starter 1, and accordingly, starting the engine with stability. The smooth engine start further contributes to a prolonged stop-idling time.

Figure 3:
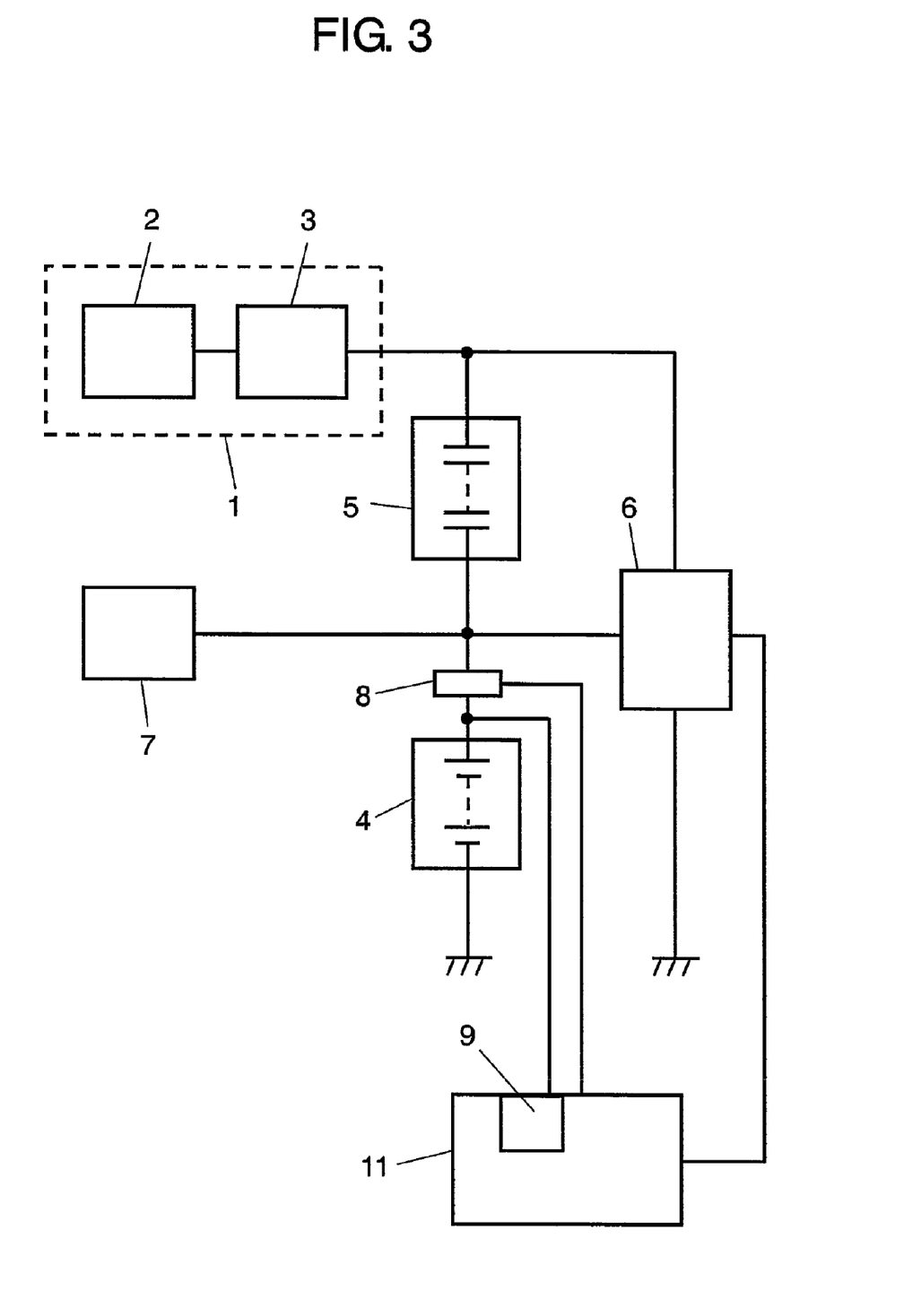
FIG. 3 is a second circuit-diagram showing the structure of the engine start device in accordance with the first exemplary embodiment.

FIG. 3 is a second circuit-diagram showing the structure of the engine start device in accordance with the first exemplary embodiment. In FIG. 3, like parts are identified by the same reference numerals as in FIG. 1 and the explanation hereinafter will be focused on the structure that differs from that of FIG. 1.

Current-detecting means 8 in FIG. 3 detects the current of battery 4. Voltage-detecting means 9 detects the voltage of battery 4. Both of them are connected to controller 11. For example, current-detecting means 8 is formed of the following structure for detecting the current using the voltage difference of devices: a Hall IC; a combination of a resistor and a signal amplifier (an operational amplifier); and a combination of a sample-and-hold circuit and an A/D converter. On the other hand, voltage-detecting means 9 is formed of the following structure for detecting the voltage: a voltage-detecting circuit is disposed to controller 11, and a lead wire is extended from the detecting point and is connected to the voltage-detecting circuit.

To find a proper charge voltage of electric double layer capacitor 5, controller 11 determines internal DC resistance of battery 4 from changes in the voltage due to the current flow from battery 4. Having connections to DC/DC converter 6, controller 11 calculates decrease in voltage at a starting time of the starter from the internal DC resistance obtained above and determines a proper charge voltage of electric double layer capacitor 5 according to the decrease in voltage.

For instance, when current-detecting means 8 and voltage-detecting means 9 detect the internal DC resistance of battery 4 of 10 mΩ, the decrease in voltage caused by a starter current of 300 A measures 3V. To make up a decrease of 3V, determining the charge voltage of electric double layer capacitor 5 to be 3V allows starter 1 to have an application voltage of approx. 12V (where, decrease in voltage of capacitor 5 is not taken into consideration).

Voltage Vc, which maximizes the application voltage to starter 1 within the range of voltage ratings, is obtained by the following expression:

$$Vc = \{Vs - (V\text{batt} - Vd)\} \quad \text{Expression 1.}$$

Where, Vs represents a voltage rating of starter 1, Vbatt represents the voltage of battery 4, Vd represents the decreased value in voltage caused by the internal DC resistance of battery 4 and the starter current (i.e., the current flow into starter 1 at a starting-up operation). Charging electric double layer capacitor 5 up to voltage Vc calculated above allows starter 1 to have a maximized application voltage in the range of voltage ratings. This increases starting torque of starter 1, enhancing efficiency and reliability of engine start.

Figure 4:
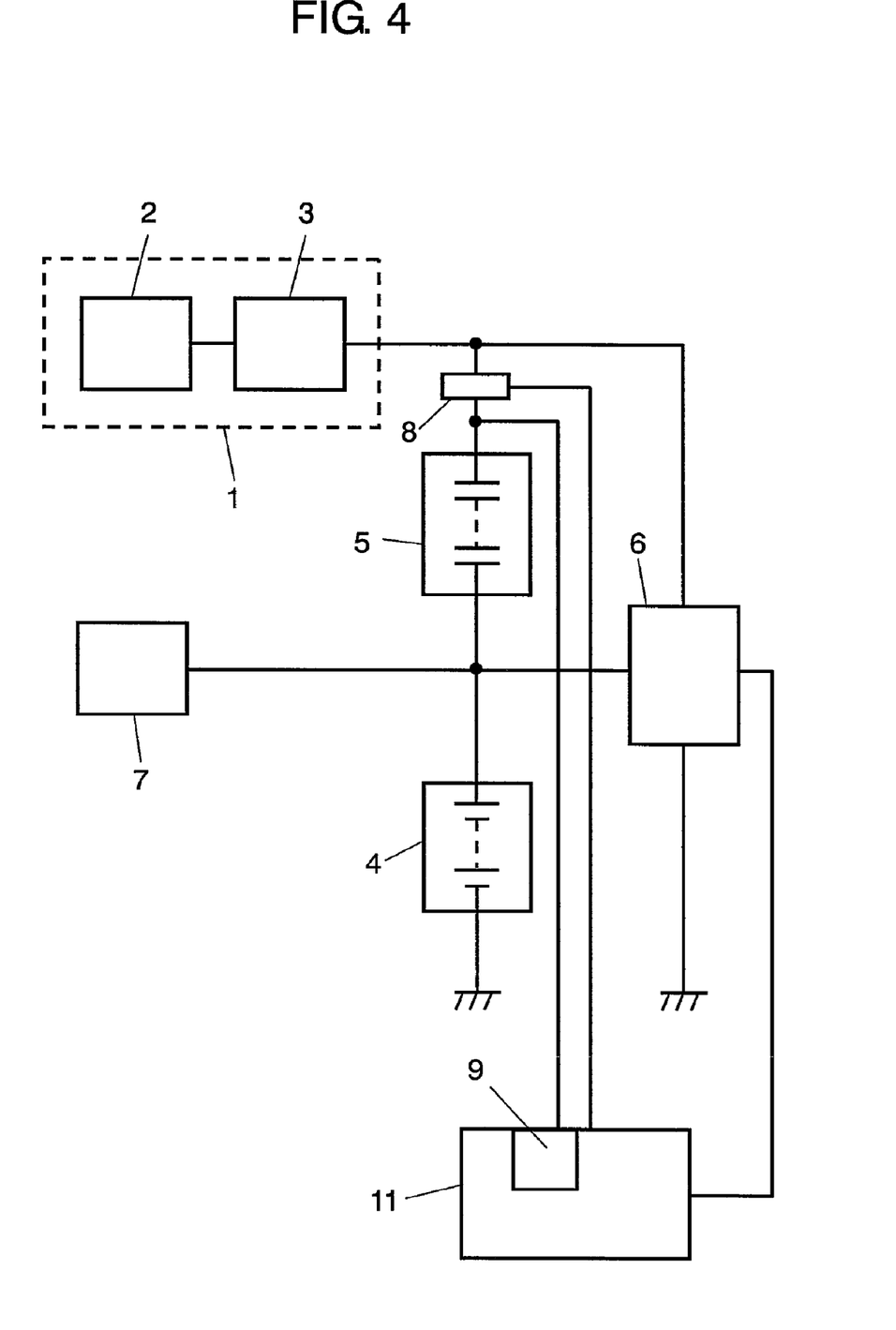
FIG. 4 is a third circuit-diagram showing the structure of the engine start device in accordance with the first exemplary embodiment.

FIG. 4 is a third circuit-diagram showing the structure of the engine start device in accordance with the first exemplary embodiment. In FIG. 4, like parts are identified by the same reference numerals as in FIG. 1 and the explanation hereinafter will be focused on the structure that differs from that of FIG. 1.

In FIG. 4, current-detecting means 8 and voltage-detecting means 9 are connected to connecting terminals of electric double layer capacitor 5.

Like battery 4, electric double layer capacitor 5 has internal DC resistance that varies depending on ambient temperature and operating environment. As is in battery 4, the internal DC resistance of capacitor 5 can be obtained.

Calculating the voltage decrease caused by the internal DC resistance of capacitor 5 and the current flow into starter 1 at a starting-up operation and adding the decreased amount of voltage on the voltage applied to starter 1, as is in the case of battery 4, allows starter 1 to have smooth starting-up.

Figure 5:
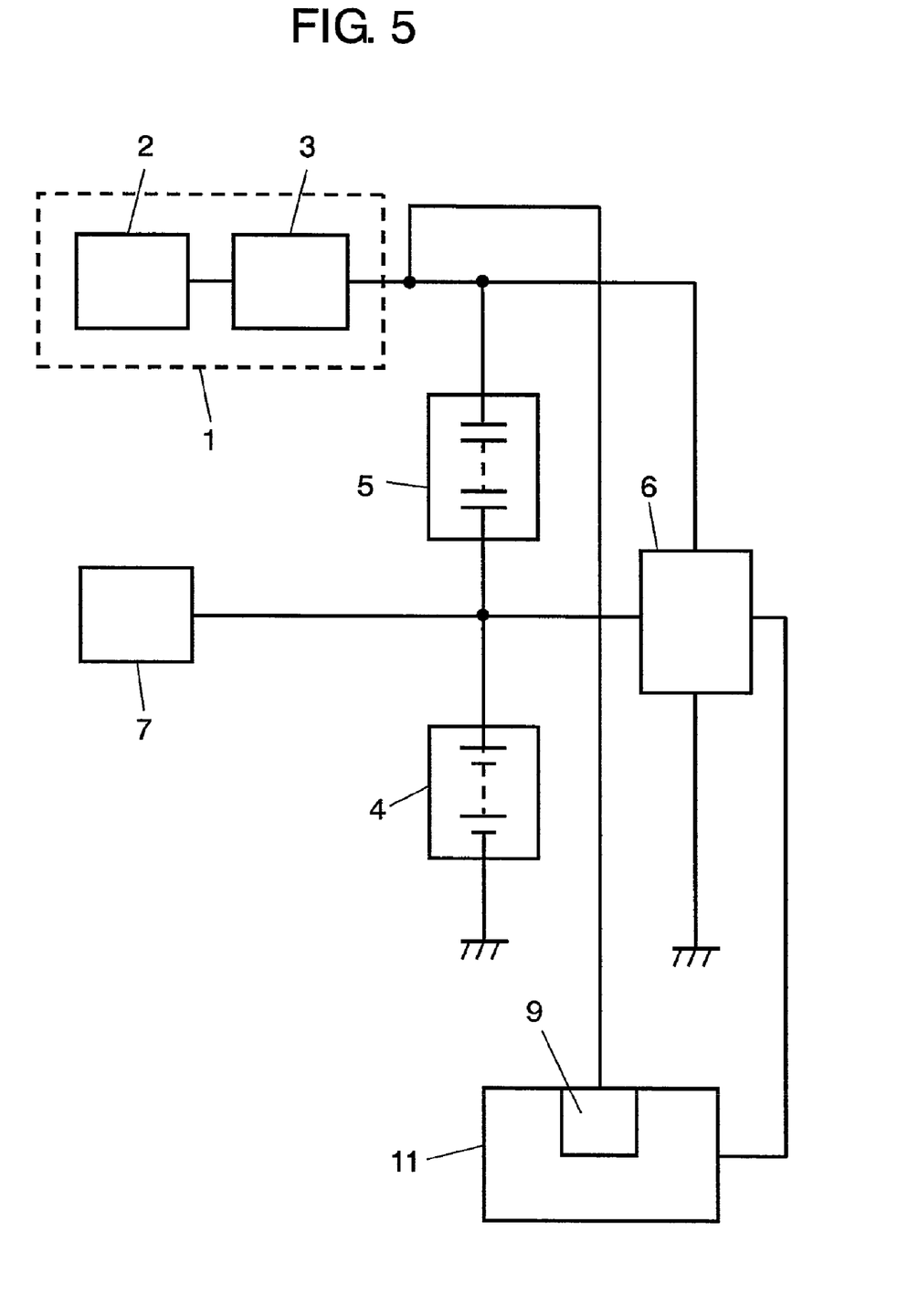
FIG. 5 is a fourth circuit-diagram showing the structure of the engine start device in accordance with the first exemplary embodiment.

FIG. 5 is a forth circuit-diagram showing the structure of the engine start device in accordance with the first exemplary embodiment. In FIG. 5, like parts are identified by the same reference numerals as in FIG. 1 and the explanation hereinafter will be focused on the structure that differs from that of FIG. 1.

FIG. 5 shows a structure in which voltage-detecting means 9 is connected to a connecting terminal of starter 1.

The total value of DC resistance of battery 4, electric double layer capacitor 5 and the wiring in the structure can be obtained by direct measurement of the terminal voltage of starter 1. According to the calculation result, the voltage of capacitor 5 is properly determined.

For instance, the voltage drop occurred in a previous restarting operation can be recorded for determining the charge voltage of capacitor 5 for the next restarting operation.

Although current-detecting means 8 and voltage-detecting means 9 is disposed individually for battery 4 and capacitor 5 in the structure of the embodiment, combined detection is also possible.

Each of internal DC resistance of battery 4 and electric double layer capacitor 5 can be obtained by driving DC/DC converter 6 on a constant current with generator 7 being in a halt. The structure above eliminates a current-detecting means, contributing to cost reduction.

Power consumption by vehicle-mounted devices, such as headlights kept ON during engine stop, and dark-current discharge caused by no use of a vehicle for a long time often bring difficulty in starting the engine because of lowered SOC (state of charge) of battery 4. Even in the cases above, the engine start device of the embodiment copes well with the problems. In the device, the energy of battery 4 is fed into electric double layer capacitor 5 and the charged voltage is added on battery voltage. That is, starter 1 can starts with application of higher voltage, allowing the engine to start.

Depending on the SOC of the battery 4, the vehicle having the battery-plus-capacitor structure enhances the starting-up performance in lowered SOC, compared to a vehicle with the battery 4 only.

Second Exemplary Embodiment

Hereinafter, the structure of the second exemplary embodiment will be described with reference to FIG. 6 and FIG. 7.

Figure 6:
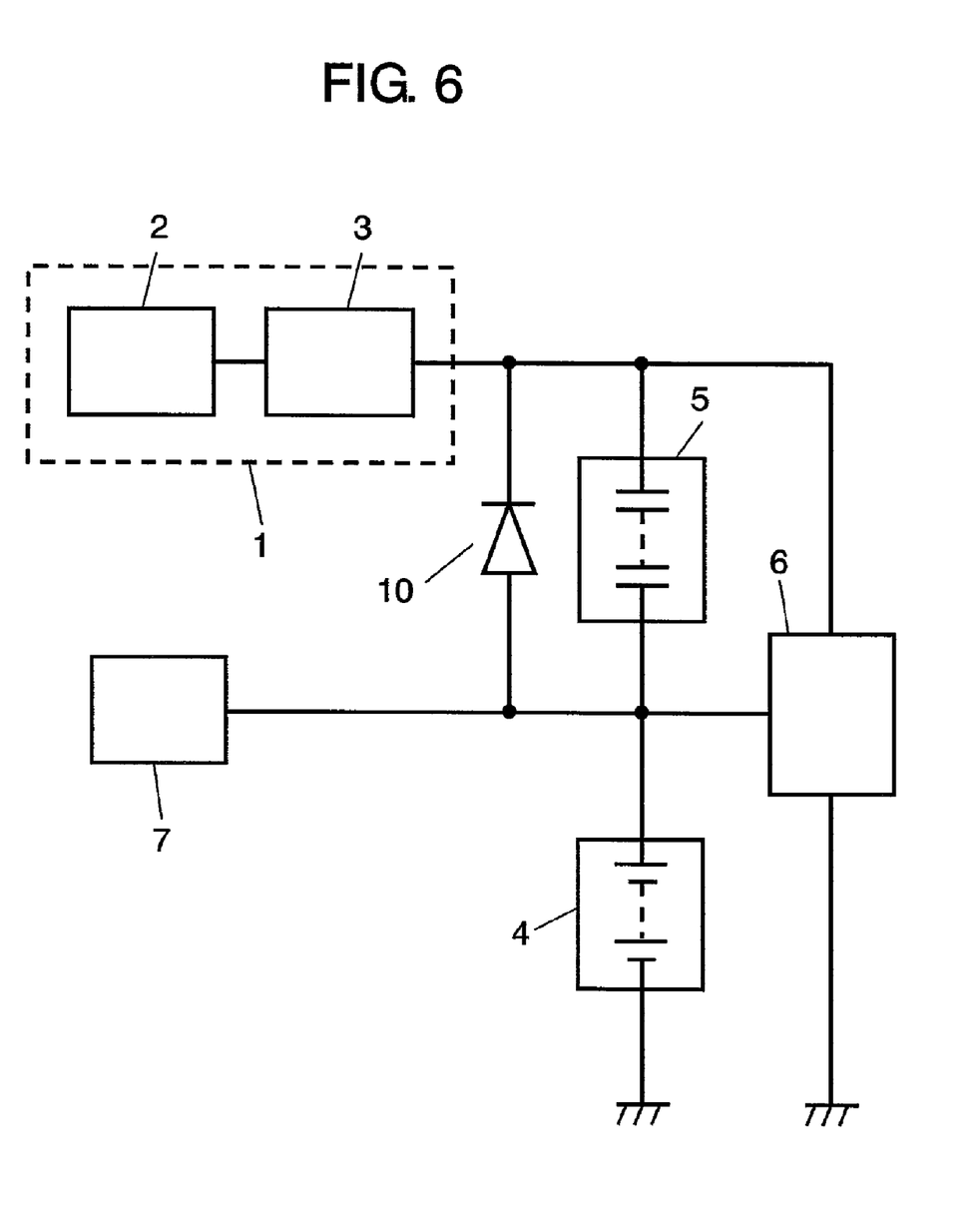
FIG. 6 is a circuit diagram showing the structure of an engine start device in accordance with a second exemplary embodiment of the present invention.

FIG. 6 is a circuit diagram showing the structure of an engine start device in accordance with the second exemplary embodiment of the present invention. In FIG. 6, like parts are identified by the same reference numerals as in FIG. 1 and the explanation thereof will be omitted.

As is shown in FIG. 6, diode 10 is connected in parallel to electric double layer capacitor 5. The cathode of diode 10 is connected to the positive pole of electric double layer capacitor 5.

Now will be described the engine start operation of the engine start device having the structure above.

In the initial start of the engine, that is, under the condition where electric double layer capacitor 5 has no charge or lack of charge, when starter relay 3 is turned ON, the voltage of battery 4 is applied to starter motor 2 via diode 10, so that electric current is fed to starter motor 2. This protects electric double layer capacitor 5 from application of reverse bias voltage.

In the first exemplary embodiment, the structure needs time for charging electric double layer capacitor 5 prior to engine start; however, the operation via diode 10 of the embodiment eliminates the charging time, providing quick engine start.

After the engine starts working, generator 7 charges battery 4. Similarly, DC/DC converter 6 charges electric double layer capacitor 5 and stops when the voltage of capacitor 5 reaches a predetermined level.

As for the engine-restart operations after stop-idling, the device operates in a manner similar to that of the first exemplary embodiment; accordingly, a similar effect is provided.

Power consumption by vehicle-mounted devices, such as headlights kept ON during engine stop, and dark-current discharge caused by no use of a vehicle for a long time often bring difficulty in starting the engine because of lowered SOC (state of charge) of battery 4. Even in the cases above, the engine start device of the embodiment copes well with the problems. When the battery voltage at engine start is lower than the predetermined voltage, DC/DC converter 6 charges electric double layer capacitor 5 up to a required level, enhancing the engine-start performance.

Even when a previous attempt in starting the engine is not succeeded, the device can enhance the engine-start performance. Prior to retrying the starting operation by starter 1, DC/DC converter 6 charges electric double layer capacitor 5 to encourage a smooth engine start.

Figure 7:
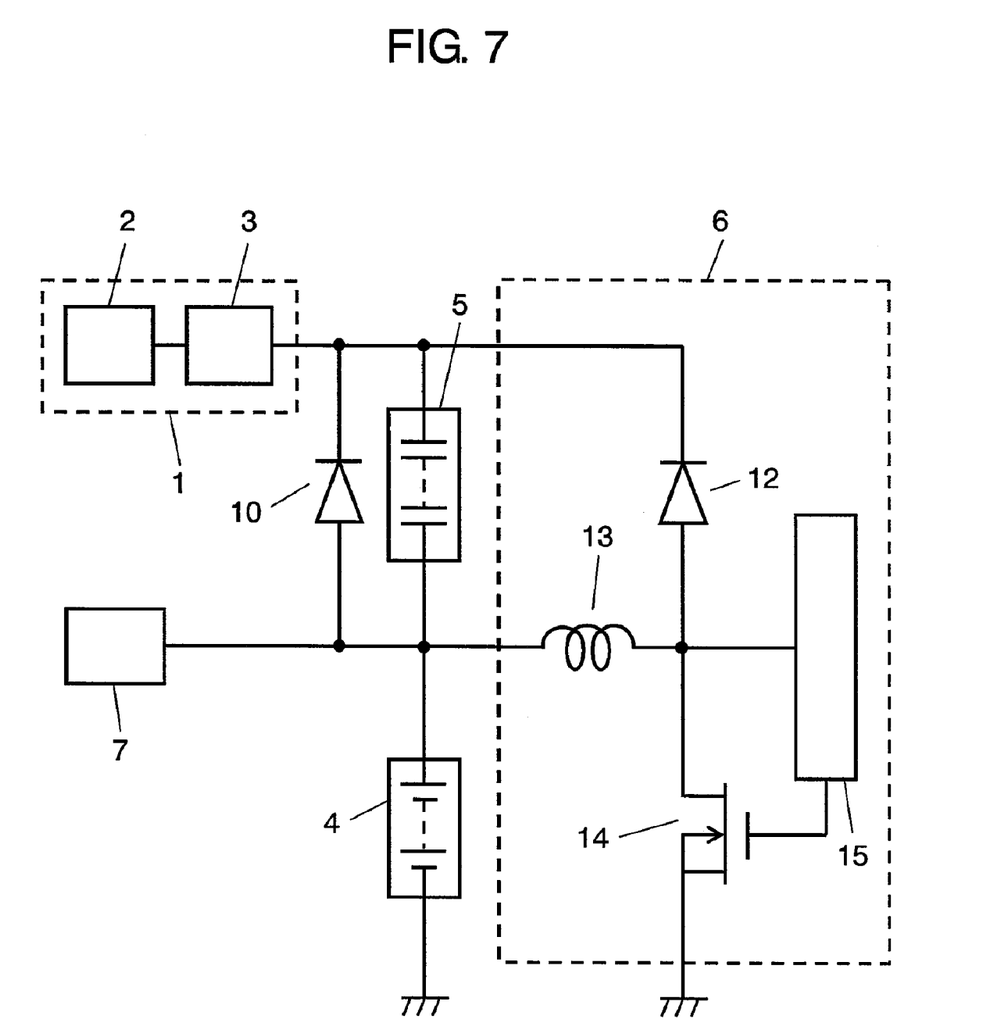
FIG. 7 is a detailed circuit diagram showing a DC/DC converter of the engine start device in accordance with the second exemplary embodiment.

FIG. 7 is a detailed circuit diagram showing an inverting chopper circuit as an example of DC/DC converter 6. DC/DC converter 6 is formed of second diode 12, choke coil 13, switching element 14 and control circuit 15. Control circuit 15 effects ON/OFF control of switching element 14. When switching element 14 maintains ON, energy builds up in choke coil 13; on the other hand, when switching element 14 maintains OFF, the build-up of energy is fed through diode 12.

When choke coil 13 consistently carries current, voltage Vc of electric double layer capacitor 5 is calculated by expression 2 below:

$$Vc = Ton \times Vb/Toff \quad \text{Expression 2.}$$

(Where, Ton and Toff represent ON-time and OFF-time of switching element 14, respectively; Vb represents the voltage of battery 4.)

Control circuit 15 effects ON/OFF control of switching element 14 so as to properly determine voltage Vc of electric double layer capacitor 5.

In the structure of the embodiment, when the engine starts with electric double layer capacitor 5 uncharged, starter current can take a path through choke coil 13 and second diode 12. As described above, a starter current as high as a few hundred amperes flows into starter motor 2. Under a surge of current flow, a DC resistance of a few milliohms in the circuit causes voltage drop of a few volts. Besides, choke coil 13 blocks the surge current from flowing into starter motor 2. These have an ill effect on start-up operations of starter 1. Disposing diode 10 eliminates the inconveniences; diode 10 provides a by-pass for the surge current and suppresses the voltage-drop. Although the structure of the embodiment employs an inverting chopper circuit as an example of DC/DC converter 6, it is not limited thereto. A boost converter and an isolating converter are similarly effective.

Third Exemplary Embodiment

Hereinafter, the structure of the third exemplary embodiment will be described with reference to FIG. 8 and FIG. 9.

The structure of the embodiment differs from those of the first and the second embodiments in that the DC/DC converter has a two-way structure. In the structure of the embodiment, like parts are identified by the same reference numerals as in the structures described in the previous two embodiments and the explanation hereinafter will be focused on the difference.

Figure 8:
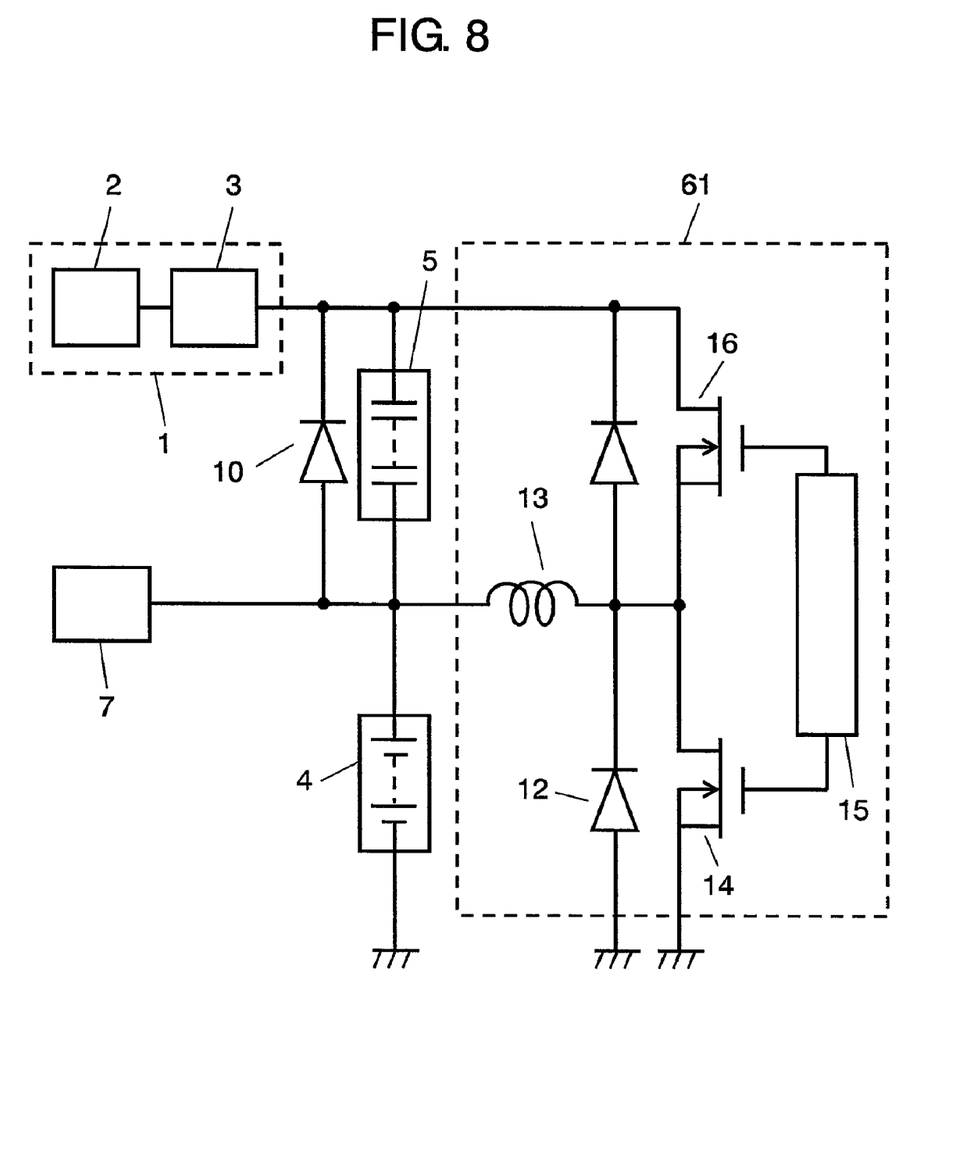
FIG. 8 is a circuit diagram showing the structure of an engine start device in accordance with a third exemplary embodiment of the present invention.

FIG. 8 is a circuit diagram showing the structure of an engine start device in accordance with the third exemplary embodiment of the present invention. DC/DC converter 61 having a two-way circuit structure also improves the performance of the engine in start-up operation.

Now will be described the effect brought by two-way DC/DC converter 61.

FIG. 8 shows an inverting chopper circuit driven on a synchronous rectification system as an example of a two-way converter. Switching element 14 is connected in series to second switching element 16. Control circuit 15 effects control of switching elements 14 and 16 so that they alternately turns ON/OFF with a predetermined dead time.

Compared to an inverting chopper circuit, the structure of the embodiment has no difference in relation between input voltage and output voltage. However, disposing second switching element 16 allows the structure to have two-way power supply.

Figure 9:
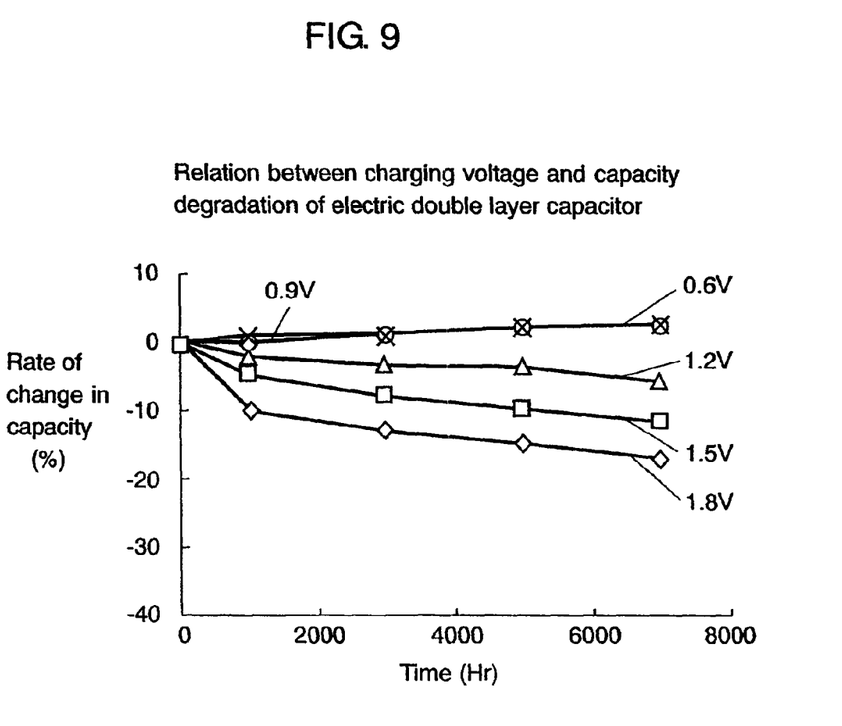
FIG. 9 shows the relation between charge voltage and capacity degradation of the electric double layer capacitor in accordance with the third exemplary embodiment.

FIG. 9 shows the relation between charge voltage and decrease in capacity (i.e., capacity degradation) of electric double layer capacitor 5. In the measurement, a load test of continuous current-passing was carried out on electric double layer capacitor 5 with a voltage rating of 2.5 V with the use of different charging capacity ranging from 1.8 V (72%) to 0.6 V (24%) and decrease in capacity was calculated. An electric double layer capacitor tested with a charging capacity of 0.6 V (24%) and 0.9 V (36%) had no degradation even after 7000 hours, whereas a capacitor tested with a charging capacity of 1.2 V (48%) had a capacity degradation of 6% after 7000 hours. The measurement result tells that electric double layer capacitor 5 should be kept in a discharged state to maintain the reliability.

According to the structure of the embodiment, after the completion of driving, two-way DC/DC converter 61 transfers the charge of electric double layer capacitor 5 to battery 4 as regenerated energy, which improves the reliability of capacitor 5 and provides energy savings.

A two-way converter carries out not only charging but also discharging that is impossible for a one-way converter.

After the completion of charging electric double layer capacitor 5 under the lowered voltage of battery 4, if battery 4 has recovered from the lowered voltage condition, the two-way converter effects control of capacitor 5 so as to decrease the voltage. This is not attained by the one-way converter.

Although the structure of the embodiment employs an inverting chopper circuit, it is not limited thereto. A boost converter and an isolating converter are similarly effective.

Besides, two-way DC/DC converter 61 attains an effective regeneration. Each time a vehicle brakes to a halt, braking energy is produced. When energy-regenerating system of a vehicle regenerates power greater than charging capacity of battery 4, the two-way converter temporarily keeps the regenerative power in electric double layer capacitor 6 and transfers it to battery 4 as required.

Although description is made on the engine start device employed for a 14V-system vehicle, it is not limited thereto as long as the vehicle is driven on a single power source. The device is also applicable to a double-volt driven vehicle including a truck.

The device of the present invention is also effectively employed for a vehicle driven on a diesel engine that undergoes a heavy load in engine start. The device allows starter 1 to have higher voltage, thereby forming battery 4 compact.

As is described above, when a vehicle with a single battery system is in the stop-idling operation, battery voltage varies depending on power consumption by vehicle-mounted devices. Even in such a case, the engine start device of the present invention allows the engine to have the starting-up operation with stability.

Besides, when the electric double layer capacitor has no charge (in the initial start of the engine) or lack of charge (due to repeated engine start), the engine start device of the present invention starts the engine by feeding current from the battery to the starter via the diode. When the vehicle restarts from stop-idling after driving for a while, the engine start device applies voltage as the total amount of the voltage of the battery and the voltage of the electric double layer capacitor, enhancing restarting performance of the engine. Furthermore, the structure has no need for additional relay circuit in the circuit that supplies a large current to the starter, providing high reliability in operation.

INDUSTRIAL APPLICABILITY

The engine start device of the present invention contributes to an improved performance of engine start, a prolonged stop-idling time and a highly reliable operation. It is therefore useful for a hybrid vehicle and a vehicle with the stop-idling function. Besides, the engine start device is easily mounted on conventional 14V-system vehicles.

The invention claimed is:

1. An engine start device comprising:
a generator connected to a driving system of an engine;
a starter connected to the driving system of the engine;
a battery charged by the generator;
an electric double layer capacitor connected between the starter and the battery;
a DC/DC converter including:
an input terminal connected to a junction point of the battery and the electric double layer capacitor; and
an output terminal connected to a junction point of the starter and the electric double layer capacitor;
a controller coupled to the DC/DC converter; and
a current-detecting means coupled to the controller, the current-detecting means for detecting current through one of the battery and the electric double layer capacitor,
wherein the controller determines an internal DC resistance of the one of the battery and the electric double layer capacitor using the detected current from the current-detecting means, and
wherein the controller controls a charging of the electric double layer capacitor by the DC/DC converter using the determined internal DC resistance so that a combined voltage of the battery and the electric double layer capacitor remains constant.

2. The engine start device of claim 1 further comprising:
a diode for applying a voltage to the starter, one terminal of the diode being connected with the starter at the junction point of the starter and the electric double layer capacitor and another terminal of the diode being connected with the battery at a junction point of the battery and the electric double layer capacitor.

3. The engine start device of claim 1, wherein the DC/DC converter is a two-way converter.

4. The engine start device of claim 1, wherein the controller calculates an amount of voltage-drop from the one of voltage of the internal DC resistance of the battery and the internal DC resistance of the electric double layer capacitor, and determines charging voltage of the electric double layer capacitor.

5. The engine start device of claim 1, wherein the controller controls a voltage for charging from the DC/DC converter to the electric double layer capacitor so that the starter starts working with constant application voltage.

6. The engine start device of claim 4 further comprising:
a voltage-detecting means for detecting the internal DC resistance of the one of the battery or the electric double layer capacitor.

7. The engine start device of claim 4, wherein the internal DC resistance of the battery or the internal DC resistance of the electric double layer capacitor is calculated from a voltage value of the battery or a voltage value of the electric double layer capacitor detected by the voltage-detecting means and a current value of the DC/DC converter in constant-current driving.

8. The engine start device of claim 5, wherein the engine start device detects voltage of the starter at start-up and determines charging voltage of the electric double layer capacitor according to the detected voltage.

9. The engine start device of claim 3, wherein the two-way converter transfers charges of the electric double layer capacitor to the battery in completion of operations of the engine.

10. The engine start device of claim 2, wherein when the voltage of the battery is lower than a predetermined voltage prior to an initial start of the engine, the DC/DC converter can charge the electric double layer capacitor before the initial start of the engine.

11. The engine start device of claim 2, wherein when an initial start of the engine is not succeeded, the DC/DC converter can charge the electric double layer capacitor prior to a following start of the engine.

12. The engine start device of claim 2, wherein the DC/DC converter is a two-way converter.

13. The engine start device of claim 2, wherein the controller calculates an amount of voltage-drop from the one of voltage of the internal DC resistance of the battery and the internal DC resistance of the electric double layer capacitor, and determines charging voltage of the electric double layer capacitor.

14. The engine start device of claim 2, wherein the controller controls a voltage for charging from the DC/DC converter to the electric double layer capacitor so that the starter starts working with constant application voltage.

15. The engine start device of claim 13 further comprising:
a voltage-detecting means for detecting the internal DC resistance of one of the battery or the electric double layer capacitor.

16. The engine start device of claim 13, wherein the internal DC resistance of the battery or the internal DC resistance of the electric double layer capacitor is calculated from a voltage value of the battery or a voltage value of the electric double layer capacitor detected by the voltage-detecting means and a current value of the DC/DC converter in constant-current driving.

17. The engine start device of claim 14, wherein the engine start device detects voltage of the starter at start-up and determines charging voltage of the electric double layer capacitor according to the detected voltage.

18. The engine start device of claim 12, wherein the two-way converter transfers charges of the electric double layer capacitor to the battery in completion of operations of the engine.

* * * * *